US006473210B1

United States Patent
Evjenth et al.

(10) Patent No.: US 6,473,210 B1
(45) Date of Patent: Oct. 29, 2002

(54) METHOD FOR MEASURING THE PERFORMANCE OF BROADBAND DENSE WAVELENGTH DIVISION MULTIPLEXER (DWDM) USING NON-LINEAR ITERATIVE ALGORITHM

(75) Inventors: Erik Evjenth, Gilroy, CA (US); Neil Roberts, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 09/377,934

(22) Filed: Aug. 20, 1999

(51) Int. Cl.⁷ ................................. H04J 14/02
(52) U.S. Cl. .................. 359/110; 359/124; 356/320
(58) Field of Search ................... 359/110, 124, 359/127, 161; 356/320

(56) References Cited

U.S. PATENT DOCUMENTS 5,894,362 A * 4/1999 Onaka et al. ............... 359/110
6,268,943 B1 * 7/2001 Kang .......................... 359/110
6,347,169 B1 * 2/2002 Kang et al. ................. 359/127

FOREIGN PATENT DOCUMENTS

EP          0 762 677 A    3/1997
WO          WO 00 13350 A  3/2000

* cited by examiner

*Primary Examiner*—Leslie Pascal
(74) *Attorney, Agent, or Firm*—Fliesler Dubb Meyer & Lovejoy, LLP

(57) ABSTRACT

A method for detecting the presence of signal channels in a wavelength-multiplexed optical signal comprises the steps of providing an initial estimate of channels to obtain a coarse spectral match, performing a coarse nonlinear deconvolutional algorithm on the wavelength-multiplexed optical signal, and finding peak power levels of the signal in the initially estimated channels. The signal channels are selected from the initially estimated channels based upon the peak power levels. In an embodiment, power levels in the signal channels of the wavelength-multiplexed optical signal are determined with refined accuracy by performing a fine nonlinear deconvolutional algorithm. In a further embodiment, the coarse and fine nonlinear deconvolutional algorithms are performed by using Jansson's nonlinear iterative method. The method is applicable to the testing of wavelength-multiplexed optical signals generated by broadband dense wavelength division multiplexers (DWDMs) and other optical communications devices.

44 Claims, 3 Drawing Sheets

METHOD FOR MEASURING THE PERFORMANCE OF BROADBAND DENSE WAVELENGTH DIVISION MULTIPLEXER (DWDM) USING NON-LINEAR ITERATIVE ALGORITHM

BACKGROUND OF THE INVENTION

1. Field of the Invention

The present invention relates to a system for monitoring an optical signal, and more particularly, to a system for monitoring a wavelength-multiplexed optical signal.

2. Background

Optical signals generated by typical dense wavelength multiplexers (DWDMs) are generally multi-channel wavelength-multiplexed signals with relatively close wavelength separations between adjacent channels. The existence of signal channels in a wavelength-multiplexed signal produced by a typical DWDM is typically detected by filtering the wavelength-multiplexed signal with either conventional narrowband tunable optical filters or conventional wideband tunable optical filters. Narrowband tunable filters may be used to provide a spectrum of a wavelength-multiplexed optical signal to obtain the signal-to-noise (S/N) ratio, gain, gain-tilt and other physical parameters. However, the bandwidths of conventional narrowband tunable filters are usually too narrow to allow proper selection and transmission of individual channels existing in a typical dense wavelength-multiplexed optical signal. Furthermore, narrowband tunable optical filters are usually expensive.

Conventional broadband tunable optical filters have also been used for channel selection and transmission of wavelength-multiplexed optical signals. While broadband tunable filters typically have bandwidths that are sufficiently wide to allow signal transmission, they usually do not have sufficiently narrow bandwidths to properly reject adjacent channels and noise when an individual channel in a typical dense wavelength-multiplexed optical signal is selected for transmission. However, broadband tunable optical filters are usually less expensive than narrowband tunable optical filters.

There is a need for a DWDM test and monitoring apparatus which is capable of effectively detecting the existence of signal channels in a dense wavelength-multiplexed optical signal while avoiding the disadvantages of direct detection of channels by either conventional narrowband tunable filters or conventional broadband tunable filters.

SUMMARY OF THE INVENTION

The present invention satisfies this need. In accordance with the present invention, a method for detecting channels in a wavelength-multiplexed optical signal comprises the steps of providing an initial estimate of channels to obtain a coarse spectral match, performing a coarse nonlinear deconvolutional algorithm on the wavelength-multiplexed optical signal, and finding peak power levels of the signal in the initially estimated channels. The signal channels are selected from the initially estimated channels based upon the peak power levels. In an embodiment, power levels in the signal channels of the wavelength-multiplexed optical signal are determined with refined accuracy by performing a fine nonlinear deconvolutional algorithm. In a further embodiment, the coarse and fine nonlinear deconvolutional algorithms are performed by using Jansson's nonlinear iterative method. The method is applicable to the testing of wavelength-multiplexed optical signals generated by broadband dense wavelength division multiplexers (DWDMs) and other optical communications devices.

Advantageously, the method according to the present invention allows signal channels existing in a wavelength-multiplexed optical signal to be determined with a small number of computational iterations. Furthermore, the power levels within the signal channels can be determined with a fine resolution in an embodiment according to the present invention. Furthermore, a relatively inexpensive broadband scanning filter can be used to scan the passband across the range of wavelengths covering the initially estimated channels, thereby saving the cost of hardware.

BRIEF DESCRIPTION OF THE DRAWINGS

The present invention will be described with respect to particular embodiments thereof, and references will be made to the drawings in which.

DETAILED DESCRIPTION

Figure 1:
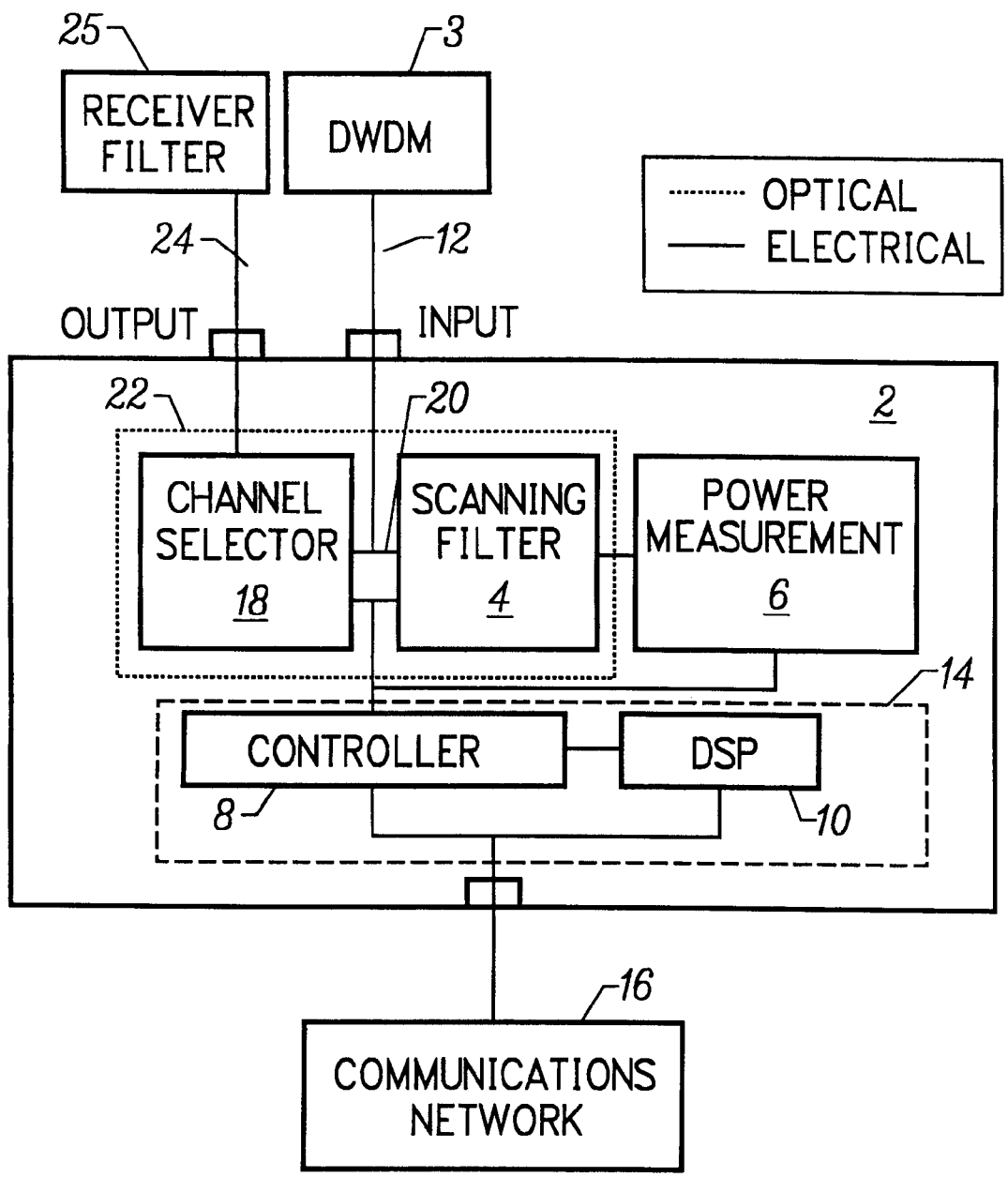
FIG. 1 is a block diagram showing an embodiment of an apparatus for monitoring a dense wavelength-multiplexed optical signal in accordance with the present invention.

FIG. 1 shows a block diagram of an embodiment of an optical signal test and monitoring apparatus according to the present invention. As shown in FIG. 1, the apparatus 2 includes a scanning filter 4, a power measurement device 6, a controller 8 and a digital signal processor (DSP) 10. The scanning filter 4 has an optical input 12 which is connected to receive a wavelength-multiplexed input optical signal having input signal power over a range of optical wavelengths. For example, the wavelength-multiplexed input optical signal may be generated by a typical dense wavelength division multiplexer (DWDM) 3. The apparatus 2 according to the present invention is applicable to the testing and measurement of wavelength-multiplexed optical signals with multiple channels generated by typical broadband DWDMs as well as other optical devices. For example, the apparatus 2 may be implemented as an optical signal analyzer for a multi-channel optical communications network.

The scanning filter 4 has a predefined time-varying varying response characteristic over the range of optical wavelengths covering the signal channels supposedly existing in the wavelength-multiplexed input optical signal. The scanning filter 4 has a passband which is capable of scanning across the range of optical wavelengths in small increments. The direction of the passband scan may be from a short wavelength to a long wavelength or visa versa. Furthermore, the scanning filter 4 is electrically connected to the controller 8, which controls the initiation and the rate of scanning the passband across the range of optical wavelengths by the scanning filter 4. In an embodiment, the scanning filter 4 comprises a conventional digitally controlled tunable broadband optical filter which is known to a person skilled in the art. In an embodiment, the instantaneous bandwidth of the scanning filter 4 is sufficiently wide to cover each of the optical channels which may potentially exist in the wavelength-multiplexed input optical signal, but narrower than the channel spacing between adjacent channels.

The scanning filter 4 is also optically connected to the power measurement device 6, which is capable of measuring in real time the power level of the input optical signal filtered by the passband of the scanning filter 4 at any instant. The power measurement device 6 is electrically connected to the controller 8 to transfer the measured results of power levels to the controller 8 as the passband of the scanning filter 4 scans across the range of optical wavelengths covering the potential channels existing in the wavelength-multiplexed input optical signal. In an embodiment, the power measurement device 6 comprises a typical optical power meter which is operable over the range of optical wavelengths covering the potential channels existing in the input optical signal.

The DSP 10 is connected to the controller 8 to detect the presence of actual signal channels existing in the input optical signal by first obtaining a rough spectral match of the input optical signal with a standard spectral grid, for example, an International Telecommunications Union (ITU) grid, to provide initially estimated channels within the range of wavelengths. The DSP 10 then performs a coarse deconvolutional algorithm to determine the existence of actual signal channels in the input optical signal. Peak power levels in the initially estimated channels can be obtained by performing a conventional peak find operation. The actual signal channels existing in the wavelength-multiplexed input optical signal are selected from the initially estimated channels based upon the peak power levels.

A fine deconvolutional algorithm can subsequently be performed only for the actual signal channels with increasingly refined corrections over iterations to obtain more accurate power levels in the actual signal channels. The deconvolutional algorithms performed by the DSP 10 will be described in further detail below.

In an embodiment, the DSP 10 comprises a typical microprocessor and memory capable of running software to perform the initial rough spectral match, the coarse deconvolutional algorithm and the peak find operation to determine the existence of actual signal channels in the input optical signal, and to perform the fine deconvolutional algorithm to determine accurately the power levels within the actual signal channels. Both the controller 8 and the DSP 10 may be included in a computer 14, such as a typical personal computer known to a person skilled in the art. In a further embodiment, the data for power levels carried by the actual signal channels existing in the wavelength-multiplexed input optical signal may be transmitted through a typical communication network 16, such as the Internet, to a remote site.

In an embodiment, the apparatus 2 according to the present invention further comprises a channel selector 18 which has an optical input capable of receiving the wavelength-multiplexed input optical signal. In the embodiment shown in FIG. 1, the channel selector 18 is optically connected to the scanning filter 4 to share the same optical input 12. For example, both the scanning filter 4 and the channel selector 18 may be connected to share the same optical input 12 by using an optical power splitter 20. In an embodiment, the scanning filter 4 and the channel selector 18 may be implemented in a single optical component assembly 22.

Furthermore, the channel selector 18 is electrically connected to the controller 8 which is capable of selecting any one of the actual signal channels for output by the channel selector 18. The channel selector 18 has an optical output 24 which carries a single-channel optical output signal in dependence upon which one of the signal channels existing in the wavelength-multiplexed input optical signal is selected by the controller 8 for output by the channel selector 18. The selection of the channel for output by the channel selector 18 may be achieved either by the DSP 10 or remotely by an operator through a communications network 16 such as the Internet, for example. The controller 8 transmits a channel select signal to the channel selector 18 to indicate which one of the signal channels is selected for output by the channel selector 18.

In a further embodiment, the optical output 24 of the channel selector 18 is connected to a communications receiver filter 25, which typically has a fixed passband covering a predetermined channel. For example, the passband of the receiver filter 25 may be centered at one of the wavelengths of a standard spectral grid, such as an ITU grid. However, the wavelength of an optical signal may be drifting from the predetermined channel which it supposedly occupies as it travels through a typical optical communications network, thereby resulting in a discrepancy between the fixed passband of the receiver filter 25 and the spectrum of the optical signal received from the output 24. In contrast, the scanning filter 4 in the apparatus according to the present invention allows wavelength-drifted optical signals to be detected even if they do not perfectly match standard spectral grid channels. Since the response characteristics of the receiver filter 25 are typically known or can be measured conventionally, the receiver filter characteristics can be programmed in the DSP 10, such that when a discrepancy between the signal spectrum and the fixed passband of the receiver filter is detected as a result of wavelength drifting of the input optical signal, a warning can be sent out to indicate that the spectrum of the optical signal has drifted from its intended channel.

Figure 2:
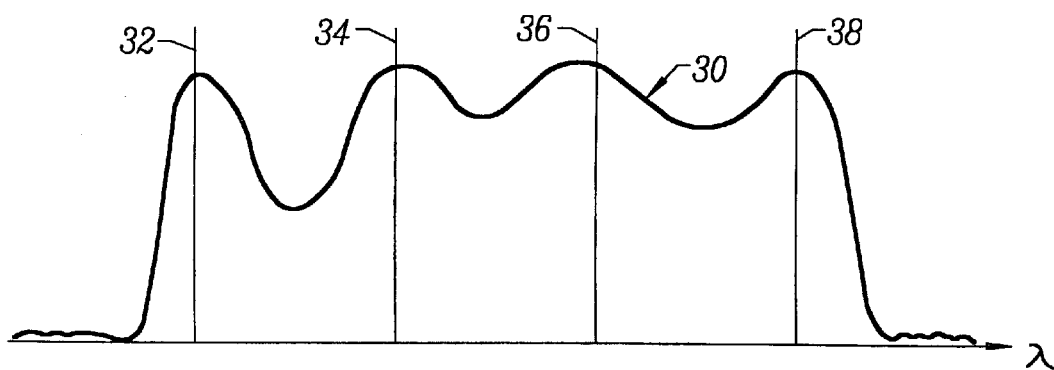
FIG. 2 shows a diagram of an example of raw signal power of a typical wavelength-multiplexed input optical signal and a typical four-channel spectral grid over a wavelength domain.

Numerical operations including at least one deconvolutional algorithm is performed by the DSP 10 to detect the presence of actual signal channels existing in the wavelength-multiplexed input optical signal and to determine the power levels within each of the signal channels. FIG. 2 is a diagram showing an example of a raw signal power curve 30 of the input optical signal received at the input 12 of the apparatus of FIG. 1 over a wavelength domain $\lambda$. In FIG. 2, the raw signal power curve 30 carries four signal channels corresponding to a predetermined spectral grid of four channels 32, 34, 36 and 38 at predefined center channel wavelengths.

In an embodiment, the predetermined spectral grid comprises a standard International Telecommunications Union (ITC) grid over a specified wavelength range. For example, a typical optical fiber communications system may have a typical operable wavelength range of about 1535 nm to about 1565 nm. When the apparatus according to the present invention is implemented for the testing of a typical four-channel DWDM within the wavelength range of 1535 nm to 1565 nm, for example, covering ITU Grid numbers 25, 27, 29 and 31, the center channel wavelengths for the four channels are located at 1549.32 nm, 1550.92 nm, 1552.52 nm, and 1554.13 nm, respectively.

As shown in FIG. 2, the raw signal power curve 30 of an input optical signal received from a typical broadband DWDM may not have well-defined spikes at or near the center wavelengths of the respective channels. Although the "peaks" of the raw signal power curve 30 tend to be at or near the channels in which information in the wavelength-multiplexed input optical signal is carried, the raw signal power curve 30 may be blurred between the channels as the input optical signal is received at the input 12 of the apparatus. The apparatus according to the present invention allows the actual signal channels in the input optical signal to be detected and the signal power within each of the actual signal channels to be determined by performing numerical algorithms on the raw signal power curve 30.

The data for raw signal power is first obtained over a user-defined wavelength range, for example, a wavelength range of about 1535 nm to about 1565 nm. A predetermined spectral grid, such as a standard ITU grid, is then used to provide an initial guess of channels present in the input optical signal generated by the DWDM. Initially estimated channels within the range of wavelengths are obtained by comparing the raw signal power curve 30 to a predetermined spectral grid such as the ITU grid to obtain a coarse spectral match. Only a rough estimate of channels present in the wavelength-multiplexed input optical signal is needed at this stage. Channels which are not actually present in the input optical signal can later be eliminated by using numerical techniques described below.

In order to determine the presence of signal channels in the input optical signal using the apparatus according to the present invention, a first nonlinear deconvolutional algorithm is performed on the input optical signal. In an embodiment, deconvolutional operations using Jansson's nonlinear iterative method is performed to determine the presence of signal channels in the wavelength-multiplexed input optical signal based upon the initially estimated channels. Because the response characteristic of the scanning filter is time-varying in nature, it may be impractical to use traditional Fourier analysis, which would require an assumption that the filter is linear and time-invariant, to detect and measure signal power within the individual channels of the wavelength-multiplexed optical signal.

Figure 3:
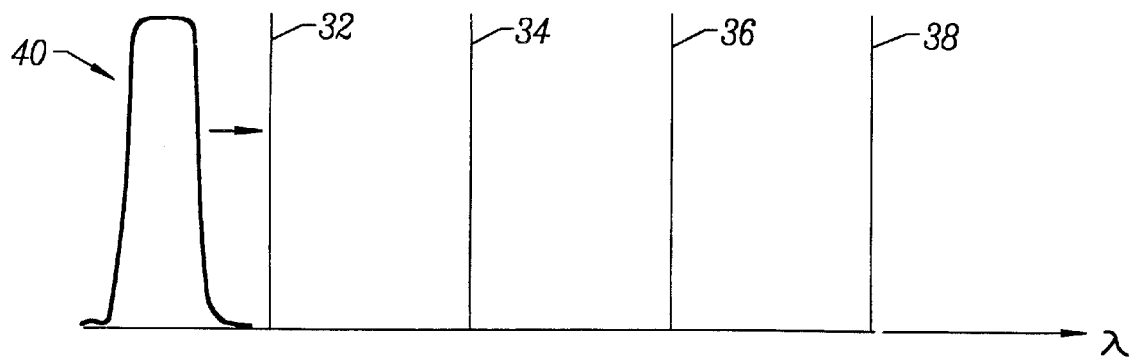
FIG. 3 is a diagram showing an example of a passband of a typical scanning filter which is capable of scanning its passband across the spectral grid.

The time-varying scanning filter characteristic, that is, the time-varying transfer response of the scanning filter over at least the range of wavelengths covering the channels potentially existing in the optical signal, is provided to the DSP. The scanning filter characteristic can be obtained from product specifications or prior measurements which can be performed by a person skilled in the art. FIG. 3 shows an example of the moving passband 40 of a typical scanning filter which is capable of scanning across at least the range of wavelengths within which the input optical signal power is to be measured.

Before the Jansson's nonlinear iterative algorithm is performed, initial power levels set at artificially low values are assigned to the initially estimated channels respectively to initiate the deconvolutional operation within the first iteration. The Jansson's nonlinear iterative algorithm for each of the initially estimated channels is expressed by the equation below:

$$O^{n+1} = O^{(n)} + K^{(n)}[i - s \otimes O^{(n)}]$$

wherein i is the raw signal power measured and sampled for digital signal processing, s is the time-varying scanning filter characteristic, and $O^{(n)}$ is the power level assigned to the initially estimated channel in the $n^{th}$ iteration. A relaxation factor K is used to scale the magnitude of correction within each iteration. The quantity $K^{(n)}$ in the above equation represents the relaxation factor for the $n^{th}$ iteration. The relaxation factor $K^{(n)}$ may be a constant quantity or a variable quantity depending upon the amount of correction desired in each iteration and the desired rate of convergence. The resulting power level $O^{(n+1)}$ denotes the power level assigned to the initially estimated channel in the $(n+1)^{th}$ iteration, which is the iteration immediately after the $n^{th}$ iteration.

As shown in the equation above, a convolutional operation is performed on the scanning filter characteristic s and the power level $O^{(n)}$ assigned to a specific initially estimated channel. In the first iteration wherein n=0, the initial power level assigned to the initially estimated channel is used as the quantity $O^{(0)}$. Since the initial power level assigned to each of the initially estimated channels is very low, the convolved result $s \otimes O^{(0)}$ is usually a small quantity. The convolved result $s \otimes O^{(0)}$ is subtracted from the raw signal power i to obtain an error $[i - s \otimes O^{(0)}]$. A correction quantity is obtained by multiplying the error by the relaxation factor $K^{(0)}$ in the first iteration, and the correction quantity is added to the initial power level $O^{(0)}$ to obtain a second power level $O^{(1)}$ which is used in the second iteration.

Within the second iteration, a convolutional operation is performed on the scanning filter characteristic and the second power level $O^{(1)}$ to obtain a second convolved result $s \otimes O^{(1)}$. The second convolved result is subtracted from the raw signal power i to obtain a second error $[i - s \otimes O^{(1)}]$, which is multiplied by the relaxation factor $K^{(1)}$ within the second iteration to obtain a second correction quantity. The second correction quantity is then added to the second power level $O^{(1)}$ to obtain a third power level $O^{(2)}$. The iterative steps described above are repeated for a number of iterations to determine if there is convergence of power within each of the initially estimated channels.

In an embodiment, a first determination is made as to whether any of the initial estimated channels are the actual signal channels present in the wavelength-multiplexed input optical signal before the power levels are determined accurately for each of the actual signal channels. In order to determine the presence of actual channels present in the wavelength-multiplexed input optical signal, a coarse deconvolutional algorithm using Jansson's nonlinear iterative method is first performed for each of the initial estimated channels based upon the initial power levels, the raw signal power and the scanning filter characteristic to obtain a power spectrum of the signal within the initially estimated channels.

For the coarse nonlinear iterative algorithm, a constant relaxation $K_0$ is used. For fast convergence of results to determine the presence of actual signal channels, a relatively large value of $K_0$ is used and only a relatively small number of iterations are performed for each of the initially estimated channels. Sufficient convergence may be obtained for the determination of actual signal channels present in the input optical signal after only about 10 to 20 iterations, for example. The DSP may be programmed to stop performing the coarse nonlinear iterative deconvolutional algorithm after a fixed number of iterations, or based upon a condition that the change of power level from the nth iteration to the $(n+1)^{th}$ iteration be less than a predefined threshold.

After the power spectrum of the signal within the initially estimated channels is obtained by performing the coarse nonlinear iterative algorithm, peak power levels of the signal within the initially estimated channels are obtained from the power spectrum. The actual signal channels are then selected from the initially estimated channels based upon the peak power levels within the initially estimated channels. In an embodiment, the actual signal channels present in the wavelength-multiplexed input optical signal are selected by determining whether the peak power level is greater than the initial power level assigned to each of the initially estimated channels. If the peak power level is greater than the initial power level in the initially estimated channel, this initially estimated channel is selected as one of the actual signal channels.

Since the power levels in the actual signal channels that exist in the wavelength-multiplexed input optical signal tend to converge and increase in magnitude with increasing number of iterations, comparing the peak power levels after performing the coarse nonlinear iterative deconvolutional algorithm to the respective initial power levels is a convenient way of determining the existence of actual signal channels in the input optical signal. Power levels in the initially estimated channels that are not the actual signal channels existing in the input optical signal tend to either remain at the artificially set initial power levels or decrease in magnitude after a number of iterations. The initially estimated channels in which the power levels remained at the initial power levels or decreased in magnitude after performing the coarse deconvolutional algorithm are discarded, thereby saving computational time during the performance of the subsequent fine nonlinear iterative deconvolutional algorithm in which a relatively large number of iterations are performed only for the actual signal channels existing in the wavelength-multiplexed input optical signals to obtain more accurate results of power levels in each of the actual signal channels with fine resolutions.

In an embodiment, a fine nonlinear iterative deconvolutional algorithm is performed to obtain the power levels within the signal channels existing in the wavelength-multiplexed optical signal after the signal channels are selected. The fine deconvolutional algorithm may be performed by using Jansson's nonlinear iterative method described above. In an embodiment, the fine nonlinear iterative deconvolutional algorithm is performed with variable relaxation factors $K^{(n)}$ which decreases as the number of iterations increases, to provide progressively finer corrections to the computed power levels to obtain more accurate results. In a further embodiment, the relaxation factor $K^{(n)}$ decreases linearly with respect to an increasing number of iterations.

Figure 4:
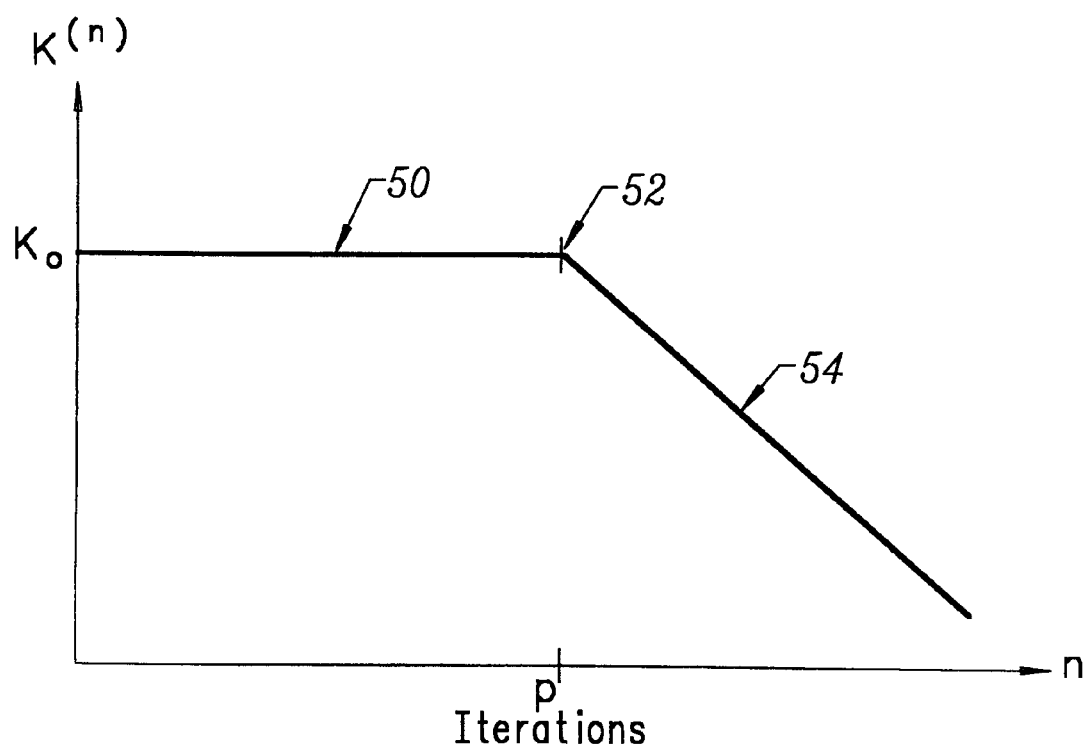
FIG. 4 is a diagram of the relaxation factor K versus the number of iterations n when the coarse and fine deconvolutional algorithms are performed on the wavelength-multiplexed optical signal.

FIG. 4 shows a diagram of the relaxation factor $K^{(n)}$ versus the number of iterations n. Within an initial number of iterations in which the coarse nonlinear iterative deconvolutional algorithm using Jansson's method is performed for the selection of actual signal channels from the initially estimated channels, the relaxation factor is a constant $K_0$, as indicated by line segment 50. After the coarse nonlinear iterative deconvolutional algorithm is completed, a peak find operation is performed and the actual signal channels are selected from the initially estimated channels based upon the peak power levels at point 52.

The fine nonlinear iterative deconvolutional algorithm using Jansson's method is then performed for each of the actual signal channels with linearly decreasing relaxation factors $K^{(n)}$ as indicated by line segment 54. Although the embodiment of first using a constant relaxation factor in a coarse nonlinear iterative deconvolutional algorithm to obtain actual signal channels and then using linearly decreasing relaxation factors in a subsequent fine nonlinear iterative algorithm to obtain refined power levels is described and illustrated herein, other types of curves for the relaxation factor $K^{(n)}$ versus the number of iterations n can also be used within the scope of the present invention.

The fine nonlinear iterative deconvolutional algorithm may be performed in the same manner as the coarse nonlinear iterative deconvolutional algorithm described above, except that different relaxation factors are used in different iterations. For example, within an iteration of performing the fine nonlinear iterative deconvolutional algorithm wherein n=p, a convolutional operation is performed on the scanning filter characteristic s and the peak power level $O^{(p)}$ to obtain a first convolved result $s \otimes O^{(p)}$. The first convolved result is subtracted from the raw signal power i to obtain a first error $[i-s \otimes O^{(p)}]$, which is then multiplied by a first relaxation factor $K^{(p)}$ to obtain a first correction quantity $K^{(p)}[i-s \otimes O^{(p)}]$. The first correction quantity is added to the peak power level $O^{(p)}$ to obtain a refined power level $O^{(p+1)}$, which is fed back to the iterative loop for the subsequent iteration during the performance of the fine deconvolutional algorithm.

In the subsequent iteration wherein n=p+1, a second relaxation factor $K^{(p+1)}$, which is less than the first relaxation factor $K^{(p)}$, is provided to obtain a more refined correction quantity. As in the previous iteration, a convolutional operation is performed on the scanning filter characteristic s and the refined power level $O^{(p+1)}$ in the subsequent iteration (p+1) to obtain a second convolved result $s \otimes O^{(p+1)}$. The second convolved result is subtracted from the raw signal power i to obtain a second error $i-s \otimes O^{(p+1)}$ to obtain a second error $[i-s \otimes O^{(p+1)}]$, which is in turn multiplied by the second relaxation factor $K^{(p+1)}$ to obtain a second correction quantity. The second correction quantity is added to the refined power level $O^{(p+1)}$ to obtain a further refined power level $O^{(p+2)}$.

The fine nonlinear deconvolutional iterative algorithm may be performed with a large number of iterations, for example, about 50 to 100 iterations, with linearly decreasing relaxation factors $K^{(n)}$ to obtain increasingly refined power levels within the selected signal channels existing in the wavelength-multiplexed input optical signal. The DSP may be programmed to stop performing the fine nonlinear iterative deconvolutional algorithm after a fixed number of iterations, for example, or based upon a condition that the amount of change in the power level between immediate iterations be less than a defined threshold, thereby indicating convergence of computed power levels within the signal channels existing in the wavelength-multiplexed optical signal.

Figure 5:
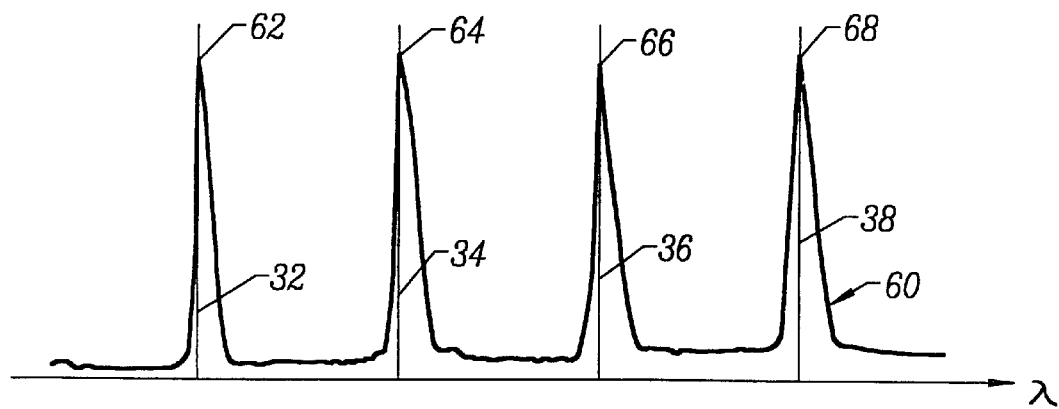
FIG. 5 is a diagram showing an example of processed power spectrum of the wavelength-multiplexed optical signal after deconvolutional algorithms using a nonlinear iterative technique are performed by the apparatus according to the present invention.

An example of a processed power spectrum 60 after the coarse and fine nonlinear iterative deconvolutional algorithms are performed by the DSP is shown in FIG. 5, with signal peaks 62, 64, 66 and 68 at or near the center wavelengths of the initially estimated channels 32, 34, 36 and 38, respectively. If any of the initially estimated channels is determined to be nonexistent in the input optical signal after the peak find operation, then the resulting power spectrum 60 would not include a power peak in the nonexistent channel.

The present invention has been described with respect to particular embodiments thereof, and numerous modifications can be made which are within the scope of the invention as set forth in the claims.

What is claimed is:

1. A method for detecting signal channels in a wavelength-multiplexed optical signal, comprising the steps of:

obtaining raw signal power of the optical signal over a predetermined range of wavelengths;

providing initially estimated channels within the predetermined range of wavelengths based upon the raw signal power;

assigning initial power levels respectively to the initially estimated channels;

providing a scanning filter characteristic;

performing a first nonlinear deconvolutional algorithm for each of the initially estimated channels based upon the initial power levels, the raw signal power and the scanning filter characteristic to obtain a power spectrum of the signal;

determining peak power levels of the signal in the initially estimated channels from the power spectrum; and determining whether signal channels exist based upon the peak power levels in the initially estimated channels.

2. The method of claim 1, wherein the step of providing the initially estimated channels comprises the step of comparing the raw signal power to a predetermined spectral grid to obtain a coarse spectral match.

3. The method of claim 1, wherein the predetermined spectral grid comprises an International Telecommunications Union (ITU) grid.

4. The method of claim 1, wherein the step of performing the first nonlinear deconvolutional algorithm comprises the step of providing a first relaxation factor.

5. The method of claim 4, wherein the step of performing the first nonlinear deconvolutional algorithm within a first iteration comprises the step of performing a convolutional operation on the scanning filter characteristic and the initial power level to obtain a convolved result.

6. The method of claim 5, wherein the step of performing the first nonlinear deconvolutional algorithm within the first iteration further comprises the step of subtracting the convolved result from the raw signal power to obtain an error.

7. The method of claim 6, wherein the step of performing the first nonlinear deconvolutional algorithm within the first iteration further comprises the step of multiplying the error by the first relaxation factor to obtain a correction quantity.

8. The method of claim 7, wherein the step of performing the first nonlinear deconvolutional algorithm within the first iteration further comprises the step of adding the correction quantity to the initial power level to obtain a second power level.

9. The method of claim 8, wherein the step of performing the first nonlinear deconvolutional algorithm further comprises the step of performing a convolutional operation on the scanning filter characteristic and the second power level in a second iteration subsequent to the first iteration.

10. The method of claim 1, wherein the step of performing the first nonlinear deconvolutional algorithm comprises the step of providing a constant relaxation factor.

11. The method of claim 1, wherein the step of determining whether signal channels exist comprises the steps of:

determining whether the peak power level is greater than the initial power level in any one of the initially estimated channels; and selecting the initially estimated channel as a signal channel if the peak power level is greater than the initial power level in the initially estimated channel.

12. The method of claim 1, further comprising the step of performing a second nonlinear deconvolutional algorithm for each of the signal channels based upon the peak power levels.

13. The method of claim 12, wherein the step of performing the second nonlinear deconvolutional algorithm within a first iteration comprises the step of providing a second relaxation factor.

14. The method of claim 13, wherein the step of performing the second nonlinear deconvolutional algorithm within the first iteration further comprises the step of performing a convolutional operation on the scanning filter characteristic and the peak power level to obtain a convolved result.

15. The method of claim 14, wherein the step of performing the second nonlinear deconvolutional algorithm within the first iteration further comprises the step of subtracting the convolved result from the raw signal power to obtain an error.

16. The method of claim 15, wherein the step of performing the second nonlinear deconvolutional algorithm within the firs t iteration further comprises the step of multiplying the error by the second relaxation factor to obtain a correction quantity.

17. The method of claim 16, wherein the step of performing the second nonlinear deconvolutional algorithm within the first iteration further comprises the step of adding the correction quantity to the peak power level to obtain a refined power level.

18. The method of claim 17, wherein the step of performing the second nonlinear deconvolutional algorithm further comprises the step of performing a convolutional operation on the scanning filter characteristic and the refined power level in a second iteration subsequent to the first iteration.

19. The method of claim 18, wherein the step of performing the second nonlinear deconvolutional algorithm in the second iteration further comprises the step of providing a third relaxation factor less than the second relaxation factor.

20. The method of claim 12, wherein the step of performing the second nonlinear deconvolutional algorithm comprises the step of providing variable relaxation factors which decrease linearly with respect to increasing number of iterations.

21. A method for detecting signal channels in a wavelength-multiple d optical signal, comprising the steps of:

obtaining raw signal power of an optical signal over a predetermined range of wavelengths;

providing initially estimated channels within the predetermined range of wavelengths based upon the raw signal power;

assigning initial power levels respectively to the initially estimated channels;

providing a scanning filter characteristic;

performing a first nonlinear deconvolutional algorithm with a first iteration and at least a second iteration subsequent to the first iteration for each of the initially estimated channels to obtain a power spectrum of the signal, the step of performing the first nonlinear deconvolutional algorithm comprising the steps of:

providing a constant relaxation factor;

within the first iteration, performing a convolutional operation on the scanning filter characteristic and the initial power level to obtain a first convolved result;

subtracting the first convolved result from the raw signal power to obtain a first error;

multiplying the first error by the constant relaxation factor to obtain a first correction quantity; and adding the first correction quantity to the initial power level to obtain a second power level; and within the second iteration, performing a convolutional operation on the scanning filter characteristic and the second power level to obtain a second convolved result;

subtracting the second convolved result from the raw signal power to obtain a second error;

multiplying the second error by the constant relaxation factor to obtain a second correction quantity; and adding the second correction quantity to the second power level to obtain a third power level;

determining peak power levels of the signal in the initially estimated channels from the power spectrum; and determining whether signal channels exist based upon the peak power levels in the initially estimated channels.

22. The method of claim 21, wherein the step of providing the initially estimated channels comprises the step of comparing the raw signal power to a predetermined spectral grid to obtain a coarse spectral match.

23. The method of claim 21, wherein the predetermined spectral grid comprises an International Telecommunications Union (ITU) grid.

24. The method of claim 21, wherein the step of determining whether signal channels exist comprises the steps of:

determining whether the peak power level is greater than the initial power level in any one of the initially estimated channels; and selecting the initially estimated channel as a signal channel if the peak power level is greater than the initial power level in the initially estimated channel.

25. The method of claim 21, further comprising the step of performing a second nonlinear deconvolutional algorithm for each of the signal channels based upon the peak power levels.

26. The method of claim 25, wherein the step of performing the second nonlinear deconvolutional algorithm within a first iteration comprises the step of providing a second relaxation factor.

27. The method of claim 26, wherein the step of performing the second nonlinear deconvolutional algorithm within the first iteration further comprises the step of performing a convolutional operation on the scanning filter characteristic and the peak power level to obtain a third convolved result.

28. The method of claim 27, wherein the step of performing the second nonlinear deconvolutional algorithm within the first iteration further comprises the step of subtracting the third convolved result from the raw signal power to obtain a third error.

29. The method of claim 28, wherein the step of performing the second nonlinear deconvolutional algorithm within the first iteration further comprises the step of multiplying the third error by the second relaxation factor to obtain a third correction quantity.

30. The method of claim 29, wherein the step of performing the second nonlinear deconvolutional algorithm within the first iteration further comprises the step of adding the third correction quantity to the peak power level to obtain a refined power level.

31. The method of claim 30, wherein the step of performing the second nonlinear deconvolutional algorithm further comprises the step of performing a convolutional operation on the scanning filter characteristic and the refined power level in a second iteration subsequent to the first iteration.

32. The method of claim 31, wherein the step of performing the second nonlinear deconvolutional algorithm in the second iteration further comprises the step of providing a third relaxation factor less than the second relaxation factor.

33. The method of claim 25, wherein the step of performing the second nonlinear deconvolutional algorithm comprises the step of providing variable relaxation factors which decrease linearly with respect to increasing number of iterations.

34. A method for determining channel characteristics of a wavelength-multiplexed optical signal, comprising the steps of:

obtaining raw signal power of an optical signal over a predetermined range of wavelengths;

providing initially estimated channels within the predetermined range of wavelengths based upon the raw signal power;

assigning initial power levels respectively to the initially estimated channels;

providing a scanning filter characteristic;

performing a coarse nonlinear iterative deconvolutional algorithm for each of the initially estimated channels based upon the initial power levels, the raw signal power and the scanning filter characteristic to obtain a power spectrum of the signal;

determining peak power levels of the signal in the initially estimated channels from the power spectrum;

determining whether signal channels exist based upon the peak power levels in the initially estimated channels; and performing a fine nonlinear iterative deconvolutional algorithm with a first iteration and at least a second iteration subsequent to the first iteration for each of the signal channels, the step of performing the fine nonlinear iterative deconvolutional algorithm comprising the steps of:

within the first iteration,
providing a first relaxation factor;
performing a convolutional operation on the scanning filter characteristic and the peak power level to obtain a first convolved result;
subtracting the first convolved result from the raw signal power to obtain a first error;
multiplying the first error by the first relaxation factor to obtain a first correction quantity; and
adding the first correction quantity to the peak power level to obtain a refined power level; and within the second iteration,
providing a second relaxation factor less than the first relaxation factor;
performing a convolutional operation on the scanning filter characteristic and the refined power level to obtained a second convolved result;
subtracting the second convolved result from the raw signal power to obtain a second error;
multiplying the second error by the second relaxation factor to obtain a second correction quantity; and
adding the second correction quantity to the refined power level to obtain a further refined power level.

35. The method of claim 34, wherein the step of providing the initially estimated channels comprises the step of comparing the raw signal power to a predetermined spectral grid to obtain a coarse spectral match.

36. The method of claim 34, wherein the predetermined spectral grid comprises an International Telecommunications Union (ITU) grid.

37. The method of claim 34, wherein the step of performing the coarse nonlinear iterative deconvolutional algorithm comprises the step of providing a constant relaxation factor.

38. The method of claim 37, wherein the step of performing the coarse nonlinear iterative deconvolutional algorithm within a first iteration comprises the step of performing a convolutional operation on the scanning filter characteristic and the initial power level to obtain a third convolved result.

39. The method of claim 38, wherein the step of performing the coarse nonlinear iterative deconvolutional algorithm within the first iteration further comprises the step of subtracting the third convolved result from the raw signal power to obtain a third error.

40. The method of claim 39, wherein the step of performing the coarse nonlinear iterative deconvolutional algorithm within the first iteration further comprises the step of multiplying the third error by the constant relaxation factor to obtain a third correction quantity.

41. The method of claim 40, wherein the step of performing the coarse nonlinear iterative deconvolutional algorithm within the first iteration further comprises the step of adding the third correction quantity to the initial power level to obtain a second power level.

42. The method of claim 41, wherein the step of performing the coarse nonlinear iterative deconvolutional algorithm further comprises the step of performing a convolutional operation on the scanning filter characteristic and the second power level in a second iteration subsequent to the first iteration.

43. The method of claim 34, wherein the step of determining whether signal channels exist comprises the steps of:
   determining whether the peak power level is greater than the initial power level in any one of the initially estimated channels; and
   selecting the initially estimated channel as a signal channel if the peak power level is greater than the initial power level in the initially estimated channel.

44. The method of claim 34, wherein the fine nonlinear iterative deconvolutional algorithm is performed with variable relaxation factors which decrease linearly with respect to increasing number of iterations.

* * * * *